UNITED STATES PATENT OFFICE.

JOSEPH H. BREWER, OF CUMBERLAND, MISSISSIPPI, ASSIGNOR OF TWO-THIRDS TO ALEX J. COOKE AND JOEL A. DALTON, OF WEBSTER COUNTY, MISSISSIPPI.

FERTILIZING COMPOUND.

SPECIFICATION forming part of Letters Patent No. 639,805, dated December 26, 1899.

Application filed January 13, 1899. Serial No. 702,118. (No specimens.)

*To all whom it may concern:*

Be it known that I, JOSEPH H. BREWER, a citizen of the United States, and a resident of Cumberland, in the county of Webster and State of Mississippi, have invented a new and useful Improvement in Fertilizing Compounds, of which the following is a specification.

In the preparation of my fertilizing compound I first make a solution comprising the following ingredients, combined in the proportions stated, viz: water, twelve gallons; saltpeter, four pounds; sal-soda, two pounds; blue-stone, two pounds; nitrate ammonia, two pounds; potash, four pounds. I then make a compound of the following ingredients in the proportions stated, to wit: of the above-described solution, two gallons; stable-manure, two hundred pounds; ashes, (preferably unleached wood-ashes,) fifty pounds; salt, sixteen pounds; lime, sixteen pounds; phosphate, eight pounds; kainit, six pounds; cotton-seed meats, three and one-half pounds. The stable-manure should be spread down, the solution sprinkled over it, and the ashes, salt, lime, phosphate, cotton-seed meats, and kainit added, the whole being thoroughly mixed and to remain in a dry place for a period of about fifty days.

By "phosphate" as used in this specification I mean acid phosphate.

By the term "cotton-seed meats" I mean the kernels or the inside of cotton-seeds from which the hulls or outside have been removed by machinery.

What I claim, and desire to secure by Letters Patent of the United States, is—

1. The herein-described solution, consisting of water, saltpeter, sal-soda, blue-stone, nitrate ammonia and potash, substantially as described and for the purpose specified.

2. The herein-described fertilizing compound, comprising stable-manure, combined with a solution in water, of saltpeter, sal-ammonia, blue-stone, potash, and cotton-seed meats and mixed with ashes, salt, lime, phosphate, kainit and cotton-seed meats, substantially as described.

JOPH. H. BREWER.

Witnesses:
JOE MARSHALL,
CLARA STERLING.